United States Patent
Fukuda (10) Patent No.: US 9,676,055 B2
(45) Date of Patent: Jun. 13, 2017

(54) ROTATING TOOL FOR FRICTION STIR WELDING AND FRICTION STIR WELDING METHOD USING SAME

(71) Applicant: UACJ Corporation, Tokyo (JP)

(72) Inventor: Toshihiko Fukuda, Tokyo (JP)

(73) Assignee: UACJ Corporation, Tokyo (JP)

( * ) Notice: Subject to any disclaimer, the term of this patent is extended or adjusted under 35 U.S.C. 154(b) by 0 days.

(21) Appl. No.: 14/635,235

(22) Filed: Mar. 2, 2015

(65) Prior Publication Data

US 2015/0174697 A1    Jun. 25, 2015

Related U.S. Application Data

(63) Continuation of application No. PCT/JP2013/073523, filed on Sep. 2, 2013.

(30) Foreign Application Priority Data

Sep. 6, 2012    (JP) .................. 2012-196479

(51) Int. Cl.
*B23K 20/12* (2006.01)
*B23K 20/233* (2006.01)
(Continued)

(52) U.S. Cl.
CPC ...... *B23K 20/1255* (2013.01); *B23K 20/1265* (2013.01); *B23K 20/2336* (2013.01);
(Continued)

(58) Field of Classification Search
None
See application file for complete search history.

(56) References Cited

U.S. PATENT DOCUMENTS 6,676,004 B1 * 1/2004 Trapp ................. B23K 20/1255
   228/112.1
8,043,021 B2 * 10/2011 Birkelbach .......... B23K 20/129
   228/112.1
(Continued)

FOREIGN PATENT DOCUMENTS

CN       201543966 U   *   8/2010
JP       2000246465 A   *   9/2000
(Continued)

OTHER PUBLICATIONS

Machine translation of JP 2000246465 A (no date available).*
(Continued)

*Primary Examiner* — Kiley Stoner
(74) *Attorney, Agent, or Firm* — Burr & Brown, PLLC (57) ABSTRACT

Providing a rotary tool for friction stir spot-welding, which makes it possible to join together two aluminum members superposed on each other, with a high degree of joint strength. The rotary tool has a probe which is provided in a central part of a distal end portion of a cylindrical tool body so as to extend coaxially with the tool body and which has a stepped structure consisting of an intermediate probe and a central probe which extend coaxially with each other. Distal end faces of the tool body and the intermediate probe respectively give a first shoulder surface and a second shoulder surface which are gradually recessed in a radially inward direction and connected to proximal portions of the respective intermediate and central probes.

9 Claims, 4 Drawing Sheets

(51) Int. Cl.
  *C22C 21/06* (2006.01)
  *B23K 101/18* (2006.01)
  *B23K 103/10* (2006.01)

(52) U.S. Cl.
  CPC .......... *C22C 21/06* (2013.01); *B23K 2201/18* (2013.01); *B23K 2203/10* (2013.01)

(56) References Cited

U.S. PATENT DOCUMENTS

| | | | | |
|---|---|---|---|---|
| 2001/0045447 | A1* | 11/2001 | Kano | B23K 20/1265 228/112.1 |
| 2002/0011509 | A1* | 1/2002 | Nelson | B23K 20/122 228/112.1 |
| 2002/0011510 | A1* | 1/2002 | Enomoto | B23K 20/1255 228/112.1 |
| 2003/0209588 | A1* | 11/2003 | Colligan | B23K 20/1255 228/112.1 |
| 2004/0057782 | A1 | 3/2004 | Okamoto et al. | |
| 2004/0108359 | A1* | 6/2004 | Hashimoto | B23K 20/1255 228/21 |
| 2005/0121497 | A1* | 6/2005 | Fuller | B23K 20/1255 228/112.1 |
| 2005/0178817 | A1* | 8/2005 | Takase | B23K 20/1265 228/112.1 |
| 2006/0151576 | A1* | 7/2006 | Akiyama | B23K 20/122 228/112.1 |
| 2006/0169740 | A1* | 8/2006 | Fukuhara | B23K 20/125 228/2.1 |
| 2006/0289608 | A1* | 12/2006 | Steel | B23K 20/1255 228/101 |
| 2007/0057015 | A1* | 3/2007 | Colligan | B23K 20/1255 228/2.1 |
| 2008/0011810 | A1* | 1/2008 | Burford | B23K 20/1255 228/2.1 |
| 2009/0072007 | A1 | 3/2009 | Nagano | |
| 2010/0089976 | A1* | 4/2010 | Szymanski | B23K 20/122 228/113 |
| 2010/0089977 | A1* | 4/2010 | Chen | B23K 20/122 228/114.5 |
| 2010/0252614 | A1 | 10/2010 | Fujii et al. | |
| 2011/0104515 | A1* | 5/2011 | Kou | B23K 20/1265 428/649 |
| 2012/0153007 | A1* | 6/2012 | Sall | B23K 20/1255 228/112.1 |
| 2012/0202089 | A1* | 8/2012 | Hangai | B32B 15/01 428/613 |

FOREIGN PATENT DOCUMENTS

| | | |
|---|---|---|
| JP | 2002-336977 A1 | 11/2002 |
| JP | 2003-326371 A1 | 11/2003 |
| JP | 2003-326372 A1 | 11/2003 |
| JP | 2004-058084 A1 | 2/2004 |
| JP | 2004-106037 A1 | 4/2004 |
| JP | 2005199334 A * | 7/2005 |
| JP | 2006167793 A * | 6/2006 |
| JP | 2007-054885 A1 | 3/2007 |
| JP | 2007301579 A * | 11/2007 |
| JP | 2008-132505 A1 | 6/2008 |
| JP | 2010-227964 A1 | 10/2010 |
| JP | 2011-026657 A1 | 2/2011 |
| JP | 2012-149319 A1 | 8/2012 |
| WO | 2007/119343 A1 | 10/2007 |
| WO | 2008/023760 A1 | 2/2008 |

OTHER PUBLICATIONS

Rockwell Science Center Friction Stir Welding (Jul. 20, 1999).*
International Search Report (Application No. PCT/JP2013/073523) dated Oct. 15, 2013 (in English).

* cited by examiner

ROTATING TOOL FOR FRICTION STIR WELDING AND FRICTION STIR WELDING METHOD USING SAME

CROSS REFERENCE TO RELATED APPLICATION

This application is a continuation of the International Application No. PCT/JP2013/073523, filed on Sep. 2, 2013, which claims the benefit under 35 U.S.C. §119(a)-(d) of Japanese Application No. 2012-196479, filed on Sep. 6, 2012, the entireties of which are incorporated herein by reference.

BACKGROUND OF THE INVENTION

Field of the Invention

The present invention relates to a rotary tool for friction stir spot-welding and a friction stir spot-welding method using the rotary tool, and more particularly to a rotary tool which makes it possible to advantageously practice a friction stir spot-welding method to join together a stack of two aluminum members at least one of which is made of an aluminum alloy material containing a large amount of Mg, with a high degree of joint strength, and a friction stir spot-welding method practiced by using the rotary tool to advantageously join together the stack of such aluminum members.

Description of Related Art

There have been recently studied techniques for spot-joining a stack of a plurality of metallic members by a friction stir spot-welding method which utilizes a friction heat to join together aluminum or other metallic members and which is proposed as a joining method that generates a small amount of heat during joining and suffers from low degrees of softening and deformation of the metallic members. It is revealed that a joint formed by the friction stir spot-welding method has a higher degree of joint quality and a sound state of joining with a higher degree of stability as compared with joints formed by conventional joining methods such as a resistive spot-welding method and a rivet joining method.

The friction stir spot-welding method is basically practiced by using a pin-type tool (rotary tool) having a structure in which a hard probe in the form of a pin is provided at a distal end of a tool body in the form of a rod. In the friction stir spot-welding method, the rotary tool is inserted into a stack of desired metallic members, while the rotary tool is rotated at a high speed. The stack is pressed with a shoulder portion consisting of a distal end portion of the tool body, to generate the friction heat between the stack and the shoulder portion and the probe, whereby a plastic flow of materials of the metallic members is caused and a stirred zone is formed around the probe. Thus, the metallic members of the stack are spot-joined at a position where the probe is inserted into the stack. In order to assure a sufficiently high degree of joint strength (welded joint strength) of a weld formed by the friction stir spot-welding method, it is necessary to sufficiently stir a joint interface between the metallic members of the stack.

On the other hand, many proposals have been made regarding the shape of the rotary tool in order to improve a stirring force generated by the rotary tool during a friction stir welding operation. For example, JP-A-2003-326372 proposes a tool with a structure in which the probe takes the form of a screw, and JP-A-2003-326371 proposes a tool with a structure in which various patterns are formed on an end face of the shoulder portion and the probe, while JP-A-2004-58084 proposes a tool with a structure in which a groove having a triangular cross sectional shape is formed over an entire circumference of an end face of the shoulder portion. Further, JP-A-2002-336977 proposes a tool with a structure in which an end face of the shoulder portion is recessed in a direction from its outer periphery toward a proximal portion of the probe, and JP-A-2004-106037 proposes a tool with a structure in which a recess is arcuately formed in an end face of the shoulder portion.

By the way, in a case where a joining operation is performed on a member made of an aluminum alloy material containing Mg in a large amount of not less than 3% (on the mass basis: in the following description, "%" means "% by mass", unless otherwise specified), such as aluminum alloy materials according to JIS A5154, JIS A5056 and JIS A5182, an oxide film generated during the joining operation contains a large amount of a stiff Mg oxide, so that the oxide film itself becomes stiff. Such an oxide film cannot be easily destructed, so that the presence of the oxide film at the joint interface would result in formation of a whisker-like or hook-like unwelded portion, giving rise to a problem that a sound weld cannot be formed, and the weld is likely to have an insufficient degree of joint strength. Particularly, in the case where the above-described friction stir spot-welding method is practiced, it is necessary to destruct the stiff oxide film with a force for stirring metals of the members to be joined together and to stir the metals of the members directly with each other, in order to assure a sufficiently high degree of joint strength. However, where at least one of the two aluminum members to be joined together is made of an aluminum alloy material containing a large amount of Mg, it was difficult to achieve a sufficiently high degree of joint strength even by using the rotary tools configured to improve the stirring force as described above.

SUMMARY OF THE INVENTION

The present invention was made in view of the background art described above. Therefore, it is an object of the invention to provide a rotary tool for friction stir spot-welding which makes it possible to join together a stack of two aluminum members with a high degree of joint strength, even where at least one of the two aluminum members is made of an aluminum alloy material containing Mg in a large amount of not less than 3%. It is another object of the invention to provide a method of advantageously performing the friction stir spot-welding operation by using such a rotary tool.

The object of the present invention described above can be achieved according to the principle of the present invention which provides a rotary tool for friction stir spot-welding, which is used to perform a friction stir spot-welding operation on a stack of two aluminum members, the rotary tool having a cylindrical tool body rotatable about its axis, and a probe which is provided in a central part of a distal end portion of the tool body so as to extend coaxially with the tool body, and which is inserted into the stack of the two aluminum members, the rotary tool being characterized in that: the probe has a stepped structure consisting of: a cylindrical intermediate probe having an outside diameter smaller than that of the tool body and projecting from the distal end portion of the tool body so as to extend coaxially with the tool body; and a cylindrical central probe having an outside diameter smaller than that of the intermediate probe and projecting from the intermediate probe so as to extend coaxially with the intermediate probe; and a distal end face of the tool body gives a first shoulder surface which is gradually recessed in a radially inward direction and which is connected to a proximal portion of the intermediate probe at a position radially inwardly spaced apart from an outer periphery of the distal end face of the tool body, while a distal end face of the intermediate probe gives a second shoulder surface which is gradually recessed in a radially inward direction and which is connected to a proximal portion of the central probe at a position radially inwardly spaced apart from an outer periphery of the distal end face of the intermediate probe.

According to a preferable form of the rotary tool for friction stir spot-welding according to the invention, at least one of the first shoulder surface and the second shoulder surface is an oblique surface obliquely extending from the outer periphery of the distal end face of the tool body or the intermediate probe toward an axis thereof at a predetermined angle to give a recessed configuration.

According to another preferable form of the rotary tool for friction stir spot-welding according to the invention, a screw portion is formed on an outer circumferential surface of the central probe. According to a still another preferable form of the rotary tool according to the invention, a distal end face of the central probe and the outer periphery of the distal end face of the intermediate probe are spaced from the tool body by a same distance.

The rotary tool for friction stir spot-welding according to the invention is advantageously used to perform the friction stir spot-welding operation on a stack of two aluminum members, at least one of which is made of an aluminum alloy material containing Mg in an amount of not less than 3% by mass.

According to a further preferable form of the rotary tool for friction stir spot-welding according to the invention, the diameter of the intermediate probe is held within a range of 40-80% of the diameter of the tool body. According to a yet further preferable form of the rotary tool according to the invention, the diameter of the central probe is held within a range of 50-90% of the diameter of the intermediate probe.

According to a further preferable form of the rotary tool for friction stir spot-welding according to the invention, an angle ($\theta_1$) of inclination of the first shoulder surface is held within a range of 10-30°. According to a yet further preferable form of the rotary tool according to the invention, an angle ($\theta_2$) of inclination of the second shoulder surface is held within a range of 10-30°.

It is another principle of the invention to provide a friction stir spot-welding method practiced on a stack of two aluminum members by using a rotary tool having a cylindrical tool body rotatable about its axis, and a probe which is provided in a central part of a distal end portion of the tool body so as to extend coaxially with the tool body, and which is inserted into the stack, the method being characterized in that: the probe of the rotary tool has a stepped structure consisting of: a cylindrical intermediate probe having an outside diameter smaller than that of the tool body and projecting from the distal end portion of the tool body so as to extend coaxially with the tool body; and a cylindrical central probe having an outside diameter smaller than that of the intermediate probe and projecting from the intermediate probe so as to extend coaxially with the intermediate probe; a distal end face of the tool body gives a first shoulder surface which is gradually recessed in a radially inward direction and which is connected to a proximal portion of the intermediate probe at a position radially inwardly spaced apart from an outer periphery of the distal end face of the tool body, while a distal end face of the intermediate probe gives a second shoulder surface which is gradually recessed in a radially inward direction and which is connected to a proximal portion of the central probe at a position radially inwardly spaced apart from an outer periphery of the distal end face of the intermediate probe; and a distal end portion of the central probe is inserted into one of the two aluminum members that is located on a forward side in a direction of insertion of the central probe.

According to a preferable form of the friction stir spot-welding method according to the invention, at least one of the two aluminum members is made of an aluminum alloy material containing Mg in an amount of not less than 3% by mass. According to another preferable form of the friction stir spot-welding method according to the invention, one of the two aluminum members that is located on a side on which the probe is inserted into the stack is made of an aluminum alloy material containing Mg in an amount of not less than 3% by mass.

According to a still another preferable form of the friction stir spot-welding method according to the invention, a distal end portion of the intermediate probe is inserted into the above-described one of the two aluminum members that is located on the forward side in the direction of insertion of the central probe.

According to a further preferable form of the friction stir spot-welding method according to the invention, only the central probe is inserted into the above-described one of the two aluminum members that is located on the forward side in the direction of insertion of the central probe.

In the rotary tool for friction stir spot-welding according to the present invention, the probe which is provided in the central part of the distal end portion of the tool body rotatable about its axis, so as to extend coaxially with the tool body, has a double-stepped structure consisting of the intermediate probe having the relatively large diameter and the central probe having the relatively small diameter. Further, the first shoulder surface given by the distal end face of the tool body and the second shoulder surface given by the distal end face of the intermediate probe are recessed in the radially inward direction of the tool body, thereby forming a double-stepped umbrella shape. Accordingly, where the probe having the double-stepped structure is inserted while it is rotated at a high speed, a considerable effect of stirring acts on a friction-stirred zone formed around the probe, owing to the double-stepped structure of the probe, particularly, owing to the presence of the intermediate probe having the second shoulder surface which forms the umbrella shape. Therefore, it is possible to form a weld having improved joint properties. Further, an effective stirring force generated as described above makes it possible to advantageously destruct a stiff oxide film formed during a joining operation performed on a member made of an aluminum alloy material containing a large amount of Mg. Therefore, in the friction stir spot-welding operation performed on the stack of the two aluminum members at least one of which is made of the aluminum alloy material containing a large amount of Mg, it is possible to reduce or prevent formation of an unwelded portion in the friction-stirred zone, to advantageously provide a joined article having a high degree of joint strength.

BRIEF DESCRIPTION OF DRAWINGS

FIG. 4 are schematic cross sectional views showing dimensions of rotary tools used in illustrated experiments which will be described later, in which FIG. 4(a) shows the rotary tool having a double-stepped umbrella shape, and FIG. 4(b) shows the rotary tool having a single-stepped umbrella shape.

DETAILED DESCRIPTION OF THE INVENTION

To clarify the present invention more specifically, embodiments of the invention will be described in detail by reference to the drawings.

Figure 1:
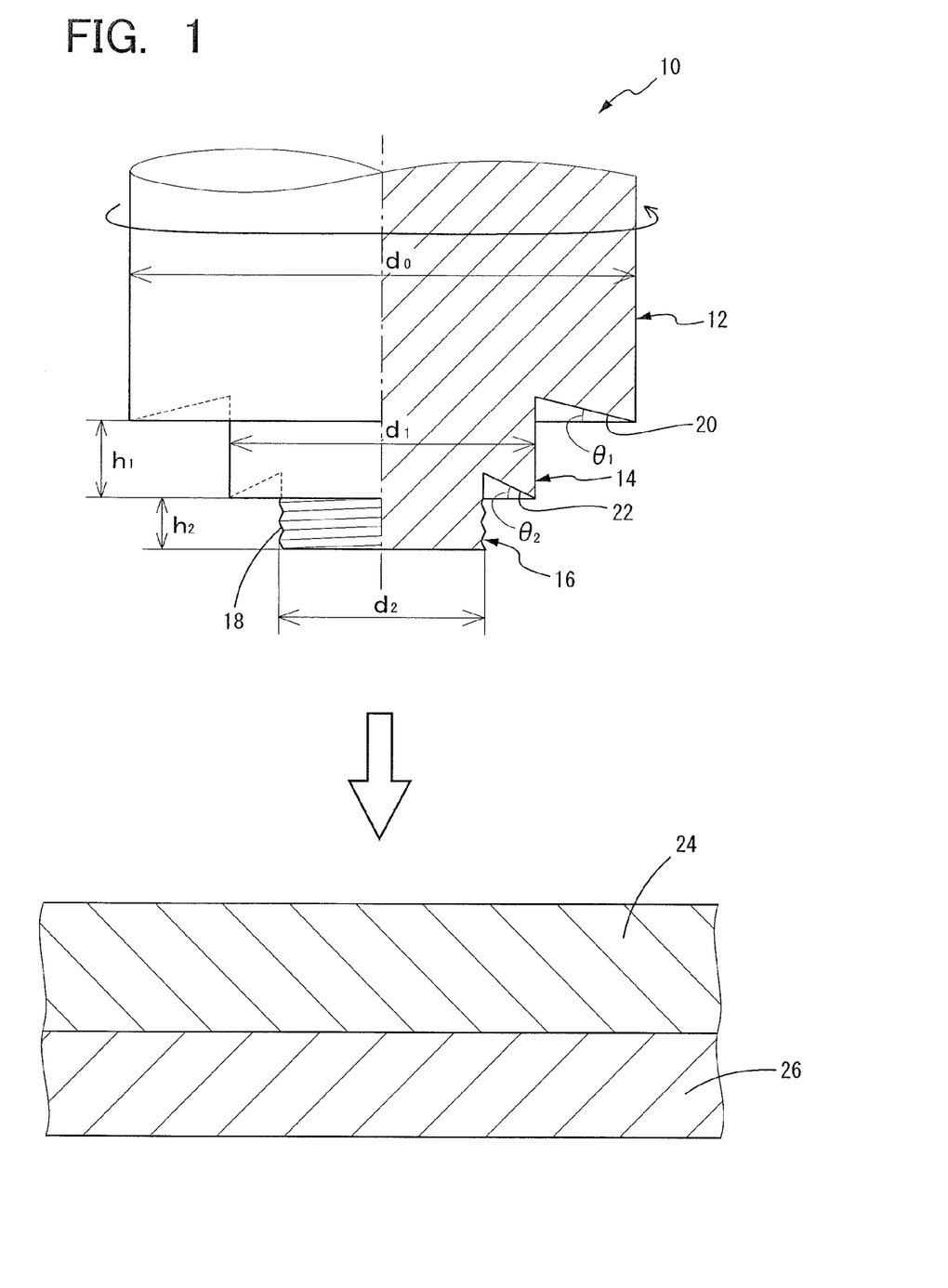
FIG. 1 is a schematic half sectional view showing a part of a rotary tool for friction stir spot-welding according to one embodiment of the invention.

Referring first to the half sectional view of FIG. 1, there is shown a part of a rotary tool 10 for friction stir spot-welding according to one embodiment of the invention. The rotary tool 10 has a cylindrical tool body 12, an intermediate probe 14 projecting from a central part of a distal end portion of the tool body 12 so as to extend coaxially with the tool body 12, and a central probe 16 projecting from a central part of a distal end portion of the intermediate probe 14 so as to extend coaxially with the intermediate probe 14. The tool body 12, the intermediate probe 14 and the central probe 16 are formed integrally with each other.

Specifically described, the tool body 12 of the rotary tool 10 is rotatable about its axis at a high speed. The intermediate probe 14 projecting from the central part of the distal end portion (a lower end portion as seen in FIG. 1) of the tool body 12 by a predetermined length so as to extend coaxially with the tool body 12 takes the form of a cylinder having an outside diameter which is smaller than that of the tool body 12. The central probe 16 projecting from the distal end portion of the intermediate probe 14 by a predetermined length so as to extend coaxially with the intermediate probe 14 takes the form of a cylinder having an outside diameter which is smaller than that of the intermediate probe 14. Namely, the intermediate probe 14 and the central probe 16 which are integrally provided in the central part of the distal end portion of the tool body 12 cooperate with each other to give a double-stepped structure. In this embodiment, a screw portion 18, which is similar to that formed in the conventional probe, is formed on an outer circumferential surface of the central probe 16, to increase an effect of stirring.

In the rotary tool 10, a distal end face (a lower surface as seen in FIG. 1) of the tool body 12 gives a first shoulder surface 20 which is gradually recessed in a radially inward direction and which is connected to a proximal portion of the intermediate probe 14 at a position radially inwardly spaced apart from the outer periphery of the distal end face of the tool body 12. Also, a distal end face (a lower surface as seen in FIG. 1) of the intermediate probe 14 gives a second shoulder surface 22 which is gradually recessed in the radially inward direction, like the first shoulder surface 20, and which is connected to a proximal portion of the central probe 16 at a position radially inwardly spaced apart from the outer periphery of the distal end face of the intermediate probe 14. In this embodiment, the first and second shoulder surfaces 20 and 22 are oblique surfaces (tapered surfaces) obliquely extending from the outer peripheries of the respective distal end faces of the tool body 12 and the intermediate probe 14 toward their axes, at respective predetermined angles ($\theta_1$ and $\theta_2$) of inclination, to give recessed configurations in the form of truncated cones. Thus, the distal end portion of the tool body 12 has a double-stepped umbrella shape in its axial cross section, which consists of an umbrella shape formed by the first shoulder surface 20 and the intermediate probe 14, and an umbrella shape formed by the second shoulder surface 22 and the central probe 16.

In a friction stir spot-welding operation performed by using the rotary tool 10 configured as described above, the intermediate probe 14 and the central probe 16 which are provided in the distal end portion of the tool body 12 are inserted into a stack of two aluminum members 24 and 26 in the form of sheets which are superposed on each other, and the probes 14 and 16 are rotated at a high speed as in the conventional friction stir spot-welding operation, whereby the two aluminum members 24 and 26 constituting the stack are friction-stirred and spot-joined. In the present invention, at least one of the two aluminum members 24 and 26 is advantageously made of an aluminum alloy material containing a large amount of Mg.

The aluminum alloy material used for the at least one of the two aluminum members 24 and 26 contains Mg in an amount of not less than 3% on the mass basis. Examples of this aluminum alloy material include aluminum alloy materials according to JIS A5154, JIS A5056, JIS A5182, JIS A5254, JIS A5082, JIS A5083, JIS A5086 and JIS A5N02. The material of the other aluminum member used in combination with the member made of the aluminum alloy material containing a large amount of Mg is not particularly limited, and various known aluminum materials may be used for the other aluminum member. It goes without saying that both of the aluminum members 24 and 26 may be made of the aluminum alloy material containing a large amount of Mg. In the present invention, it is preferable that the aluminum member 24 located on a backward side (an upper side as seen in FIG. 1) in a direction of insertion of the probes (14, 16) is made of the aluminum alloy material containing a large amount of Mg.

Figure 2:
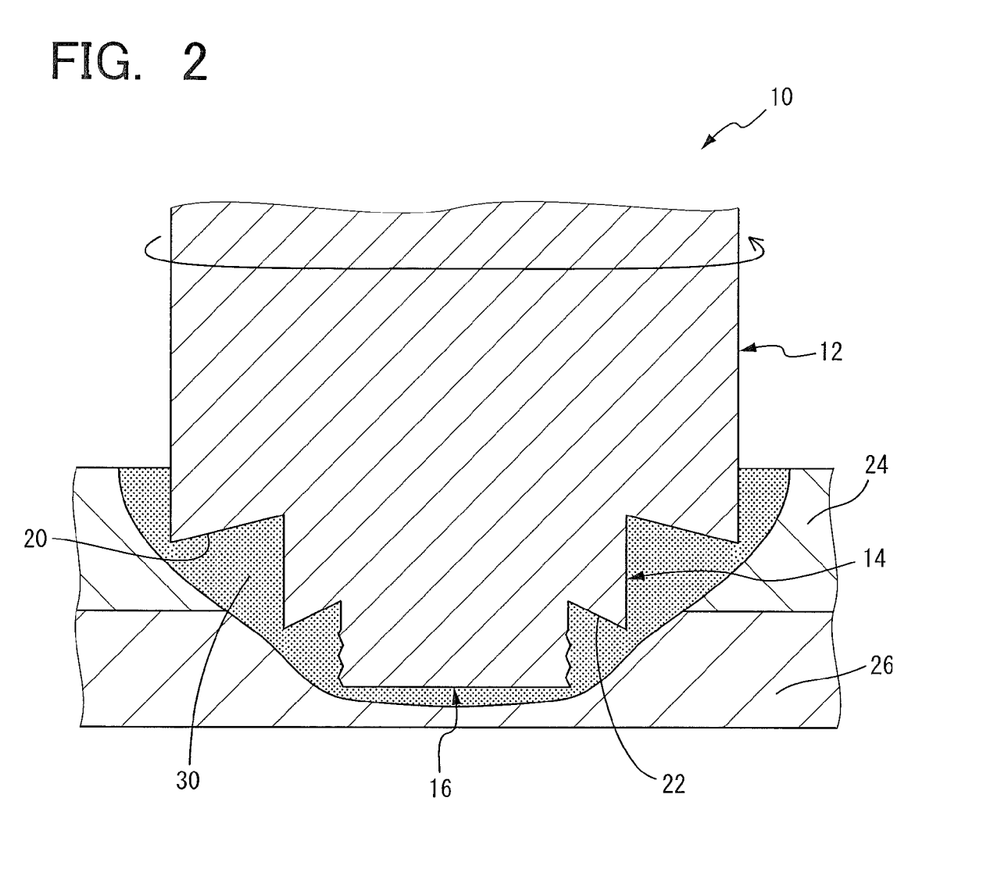
FIG. 2 is a schematic cross sectional view showing a state of performing a friction stir spot-welding operation by using the rotary tool shown in FIG. 1.

By inserting the rotary tool 10 rotated at a high speed from the upper side of the stack of the two aluminum members 24 and 26 such that the central probe 16 reaches the inside of the lower aluminum member 26, the aluminum members 24 and 26 are friction-stirred, and a stirred zone 30 is formed around the distal end portion of the tool body 12, the intermediate probe 14 and the central probe 16, as shown in FIG. 2. In the stirred zone 30, a stirring force which causes plasticization and fluidization of the materials of the aluminum members 24 and 26 is effectively increased owing to the presence of the intermediate probe 14 and the recessed configurations of the second shoulder surface 22 and the first shoulder surface 20. Accordingly, even if a stiff oxide film containing a large amount of a stiff Mg oxide is formed due to the use of the aluminum alloy material containing a large amount of Mg, the oxide film can be advantageously destructed, whereby plastic fluidity of metals of the aluminum members 24 and 26 at the joint interface can be significantly improved. As a result, formation of a whisker-like or hook-like unwelded portion can be effectively reduced or prevented, to advantageously improve joint strength of the two aluminum members 24 and 26.

In the above-described rotary tool 10, sizes of the tool body 12, the intermediate probe 14 and the central probe 16, and the configurations of the first and second shoulder surfaces 20 and 22 are adequately determined depending on thicknesses or the like of portions of the two aluminum members 24 and 26, which portions are superposed on each other to be joined together by the friction stir spot-welding operation. Generally, it is preferable that the diameter ($d_1$) of the intermediate probe 14 is about 40-80% of the diameter ($d_0$) of the tool body 12, and the diameter ($d_2$) of the central probe 16 is about 50-90% of the diameter ($d_1$) of the intermediate probe 14. Further, the angle ($\theta_1$) of inclination of the first shoulder surface 20 with respect to a plane perpendicular to the axis of the tool body 12 (a plane which is perpendicular to the axis of the tool body 12 and in which the outer periphery of the distal end face of the tool body 12 is located), and the angle ($\theta_2$) of inclination of the second shoulder surface 22 with respect to a plane perpendicular to the axis of the intermediate probe 14 (a plane which is perpendicular to the axis of the intermediate probe 14 and in which the outer periphery of the distal end face of the intermediate probe 14 is located) are generally held within a range of about 10-30°.

More specifically described, in a case where each of the two aluminum members 24 and 26 has a thickness of about 1-3 mm at a position where they are superposed on each other to be joined together, the diameter ($d_0$) of the tool body 12 is set within a range of about 6-20 mm, and the diameter ($d_1$) of the intermediate probe 14 is set within a range of about 4-10 mm, while the diameter ($d_2$) of the central probe 16 is set within a range of about 2-6 mm. Further, a distance ($h_1$) between the distal end of the tool body 12 and the distal end of the intermediate probe 14 in the axial direction of the tool body 12, i.e. a projecting length of the intermediate probe 14 is set within a range of about 1-2 mm, while a distance ($h_2$) between the distal end of the intermediate probe 14 and the distal end of the central probe 16, i.e. a projecting length of the central probe 16 is set within a range of about 0-2 mm.

Figure 3:
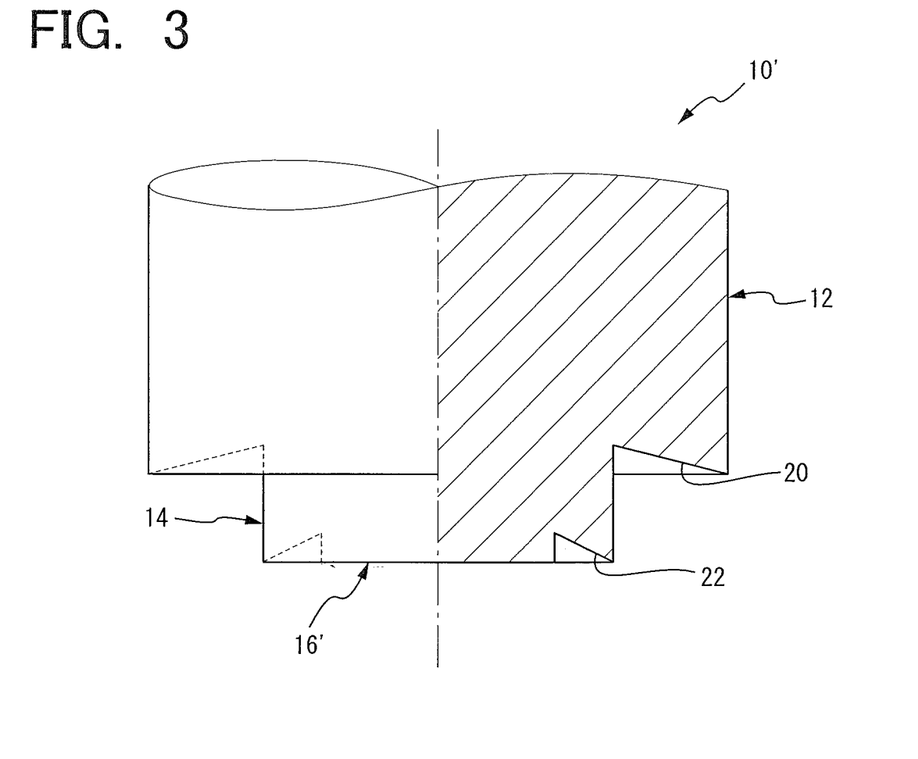
FIG. 3 is a schematic half sectional view showing a part of a rotary tool for friction stir spot-welding according to another embodiment of the invention.

FIG. 3 corresponds to the view of FIG. 1 and shows a rotary tool 10' for friction stir spot-welding according to another embodiment of the present invention. The rotary tool 10' is obtained by setting the projection length ($h_2$) of the central probe 16 of the rotary tool 10 shown in FIG. 1 at 0. Namely, in the rotary tool 10', a central probe 16' is formed so as to project within a recessed portion formed by the second shoulder surface 22 of the intermediate probe 14, such that a distal end face of the central probe 16' is located in the plane in which the outer periphery of the distal end face of the intermediate probe 14 is located. The intermediate probe 14 and the central probe 16' configured as described above also permit an effective increase of the stirring force during the friction stir spot-welding operation, so that even if the stiff oxide film exists, the stiff oxide film can be easily destructed to achieve a high degree of joint strength.

Figure 4:
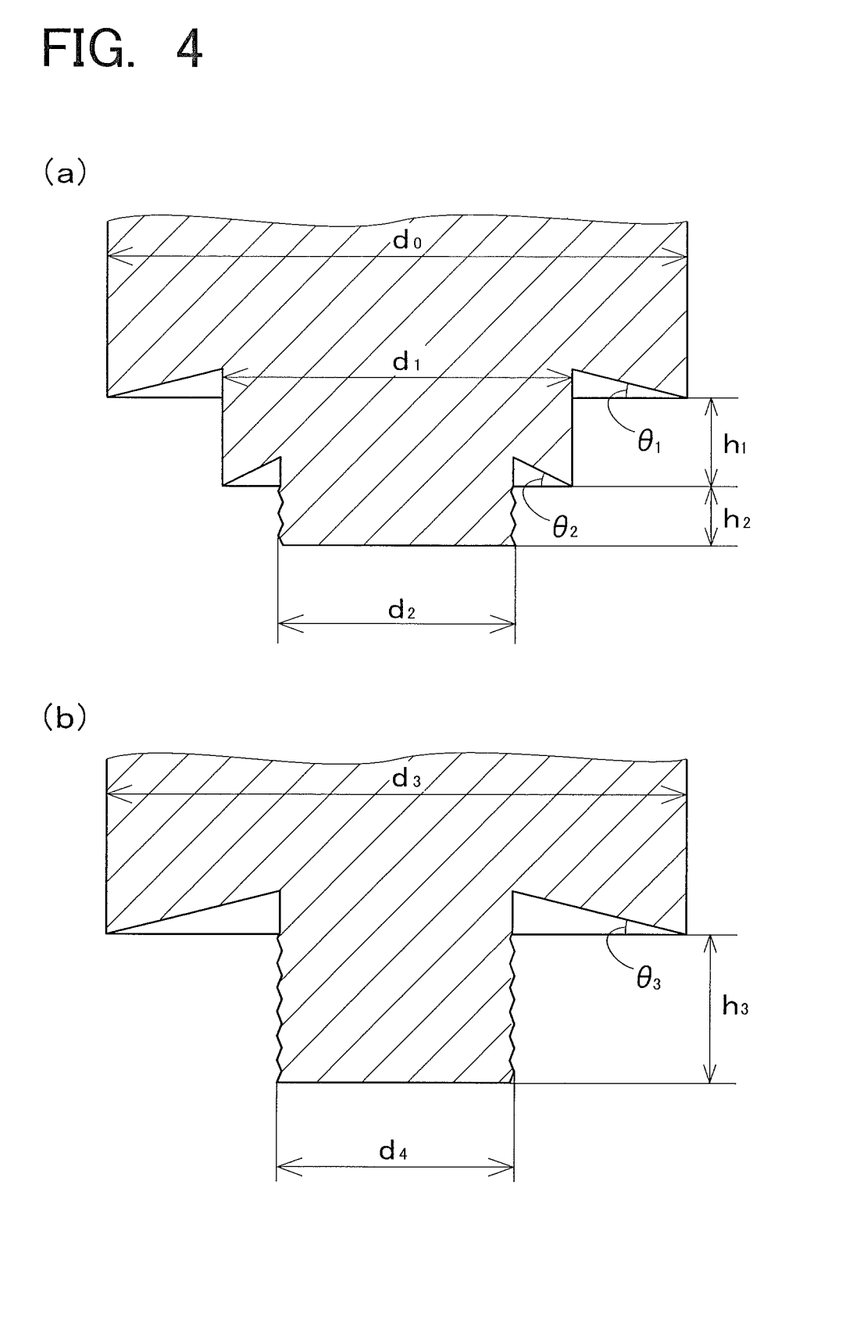

Excellent characteristics of the rotary tool for friction stir-spot welding according to the present invention can be easily understood from results of the following experiments in which the friction stir spot-welding operation was performed by using various kinds of rotary tools whose dimensions shown in FIGS. 4(*a*) and 4(*b*) differ from each other.

Initially, the various kinds of rotary tools A to K whose dimensions shown in FIGS. 4(*a*) and 4(*b*) were set as shown in Tables 1 and 2 given below were provided.

TABLE 1

| Rotary Tool | $d_0$ (mm) | $d_1$ (mm) | $d_2$ (mm) | $h_1$ (mm) | $h_2$ (mm) | $\theta_1$ (°) | $\theta_2$ (°) |
| --- | --- | --- | --- | --- | --- | --- | --- |
| A | 10 | 6 | 4 | 1.0 | 1.5 | 15 | 15 |
| B | 10 | 6 | 4 | 1.5 | 1.0 | 15 | 15 |
| C | 10 | 6 | 4 | 1.0 | 1.0 | 15 | 15 |

TABLE 1-continued

| Rotary Tool | $d_0$ (mm) | $d_1$ (mm) | $d_2$ (mm) | $h_1$ (mm) | $h_2$ (mm) | $\theta_1$ (°) | $\theta_2$ (°) |
| --- | --- | --- | --- | --- | --- | --- | --- |
| D | 10 | 6 | 4 | 1.0 | 0.5 | 15 | 15 |
| E | 10 | 6 | 4 | 1.5 | 0.5 | 15 | 15 |
| F | 10 | 6 | 4 | 1.5 | 0 | 15 | 15 |
| G | 10 | 6 | 4 | 1.0 | 1.5 | 0 | 0 |

TABLE 2

| Rotary Tool | $d_3$ (mm) | $d_4$ (mm) | $h_3$ (mm) | $\theta_3$ (°) |
| --- | --- | --- | --- | --- |
| H | 10 | 4 | 2.5 | 15 |
| I | 10 | 4 | 2.0 | 15 |
| J | 10 | 4 | 1.5 | 15 |
| K | 10 | 4 | 2.0 | 0 |

In this experiment, an aluminum sheet (O-tempered JIS A5182 material) having a thickness of 2.3 mm as an upper sheet was superposed on an aluminum sheet (T4-tempered JIS A6016 material) having a thickness of 2.0 mm as a lower sheet. By using the rotary tools A, B and H having the dimensions shown in Tables 1 and 2, the friction stir spot-welding operation was performed on an upper side of a stack of these aluminum sheets, such that the tool bodies of the rotary tools were rotated about their axes at a rotational speed of 1500 rpm or 2000 rpm, and distal end portions of the probes of the rotary tools were inserted into the lower sheet by different insertion depths (to give different remaining thicknesses of the lower sheet, i.e. different distances from the distal end faces of the central probes of the rotary tools to the lower surface of the lower sheet). Then, thus obtained various kinds of joined sheet articles were measured of their shear strengths at joint interfaces between their upper and lower sheets. Results of the measurement are shown in Table 3 given below.

TABLE 3

Conditions of Friction Stir Spot-Welding Operation

| Rotary Tool | Rotational Speed (rpm) | Insertion Depth into the Lower Sheet (mm) | Remaining Thickness of the Lower Sheet (mm) | Shear Strength (kgf) |
| --- | --- | --- | --- | --- |
| A | 2000 | 1.7 | 0.3 | 460 |
| B | 2000 | 1.7 | 0.3 | 510 |
| H | 2000 | 1.7 | 0.3 | 430 |
| A | 1500 | 1.2 | 0.8 | 420 |
| B | 1500 | 1.2 | 0.8 | 400 |
| H | 1500 | 1.2 | 0.8 | 350 |
| A | 2000 | 0.7 | 1.3 | 240 |
| B | 2000 | 0.7 | 1.3 | 290 |
| H | 2000 | 0.7 | 1.3 | 220 |
| A | 1500 | 0.2 | 1.8 | 170 |
| B | 1500 | 0.2 | 1.8 | 270 |
| H | 1500 | 0.2 | 1.8 | 70 |

As is apparent from the results shown in Table 3, it is recognized that the shear strengths of the joined sheet articles obtained by using the rotary tools A and B whose distal end portions have the double-stepped umbrella shape according to the invention are effectively improved as compared with the shear strengths of the joined sheet articles obtained by using the rotary tool H whose distal end portion has a single-stepped umbrella shape.

Further, an aluminum sheet (O-tempered JIS A5182 material) having a thickness of 2.3 mm as an upper sheet was superposed on an aluminum sheet (T1-tempered JIS A6063 material) having a thickness of 1.5 mm as a lower sheet, and the friction stir spot-welding operation was performed on an upper side of a stack of these aluminum sheets, by using the rotary tools A to G and H to K having the dimensions shown in Tables 1 and 2. Various kinds of joined sheet articles obtained by using the respective rotary tools were measured of their shear strengths at their joint interfaces. Results of the measurement are shown in Tables 4 and 5 given below.

TABLE 4

Conditions of Friction Stir Spot-Welding Operation

| Rotary Tool | Rotational Speed (rpm) | Insertion Depth into the Lower Sheet (mm) | Remaining Thickness of the Lower Sheet (mm) | Shear Strength (kgf) |
|---|---|---|---|---|
| F | 1500 | 1.2 | 0.3 | 410 |
| C | 1500 | 1.2 | 0.3 | 350 |
| G | 1500 | 1.2 | 0.3 | 230 |
| H | 1500 | 1.2 | 0.3 | 290 |
| I | 1500 | 1.2 | 0.3 | 310 |
| J | 1500 | 1.2 | 0.3 | 320 |
| K | 1500 | 1.2 | 0.3 | 270 |
| F | 1500 | 0.7 | 0.8 | 365 |
| E | 2000 | 0.7 | 0.8 | 290 |
| B | 1500 | 0.7 | 0.8 | 290 |
| D | 1500 | 0.7 | 0.8 | 260 |
| C | 1500 | 0.7 | 0.8 | 220 |
| G | 1500 | 0.7 | 0.8 | 70 |
| H | 1500 | −0.3 | 1.8 | 100 |
| I | 1500 | −0.3 | 1.8 | 110 |
| J | 1500 | −0.3 | 1.8 | 120 |
| K | 1500 | −0.3 | 1.8 | 90 |

TABLE 5

Conditions of Friction Stir Spot-Welding Operation

| Rotary Tool | Rotational Speed (rpm) | Insertion Depth into the Lower Sheet (mm) | Remaining Thickness of the Lower Sheet (mm) | Shear Strength (kgf) |
|---|---|---|---|---|
| F | 1500 | 0.2 | 1.3 | 320 |
| D | 1500 | 0.2 | 1.3 | 270 |
| B | 1500 | 0.2 | 1.3 | 240 |
| C | 1500 | 0.2 | 1.3 | 200 |
| G | 1500 | 0.2 | 1.3 | 120 |
| F | 1500 | −0.3 | 1.8 | 290 |
| A | 1500 | −0.3 | 1.8 | 200 |
| D | 1500 | −0.3 | 1.8 | 195 |
| G | 1500 | −0.3 | 1.8 | 80 |

As is apparent from the results shown in Tables 4 and 5, it is recognized that the tensile strengths of the joined sheet articles obtained by using the rotary tools A to F whose distal end portions have the double-stepped umbrella shape according to the invention are higher than the tensile strengths of the joined sheet articles obtained by using the rotary tool G whose probe has a merely stepped shape, the rotary tools H, I and J whose distal end portions have the single-stepped umbrella shape, and the rotary tool K whose distal end portion takes the form of a projecting pin. Accordingly, it is confirmed that all of the joined sheet articles obtained by using the rotary tools A to F have a sufficiently high degree of joint strength.

Further, an aluminum sheet (T1-tempered JIS A6063 material) having a thickness of 1.5 mm as an upper sheet was superposed on an aluminum sheet (O-tempered JIS A5182 material) having a thickness of 2.3 mm as a lower sheet, and the friction stir spot-welding operation was performed on an upper side of a stack of these aluminum sheets, by using the rotary tools C to F, H and J having the dimensions shown in Tables 1 and 2. Various kinds of joined sheet articles obtained by using the respective rotary tools were measured of their shear strengths at their joint interfaces. Results of the measurement are shown in Table 6 given below.

TABLE 6

Conditions of Friction Stir Spot Welding Operation

| Rotary Tool | Rotational Speed (rpm) | Insertion Depth into the Lower Sheet (mm) | Remaining Thickness of the Lower Sheet (mm) | Shear Strength (kgf) |
|---|---|---|---|---|
| C | 1500 | 1.0 | 1.3 | 270 |
| D | 1500 | 1.0 | 1.3 | 210 |
| E | 1500 | 1.0 | 1.3 | 330 |
| F | 1500 | 1.0 | 1.3 | 230 |
| H | 1500 | 1.0 | 1.3 | 140 |
| J | 1500 | 1.0 | 1.3 | 190 |

As is apparent from the results shown in Table 6, it is recognized that the tensile strengths of the joined sheet articles obtained by using the rotary tools C to F whose distal end portions have the double-stepped umbrella shape according to the invention are higher than the tensile strengths of the joined sheet articles obtained by using the rotary tools H and J whose distal end portions have the single-stepped umbrella shape. Accordingly, it is confirmed that all of the joined sheet articles obtained by using the rotary tools C to F have a sufficiently high degree of joint strength.

While some embodiments of the present invention have been described in detail for illustrative purpose only, it is to be understood that the present invention is not limited to the details of the illustrated embodiments.

Generally, the two aluminum members in the form of sheets are superposed on each other and joined together by the friction stir spot-welding operation using the rotary tool according to the present invention. However, the aluminum members in the form of sheets need not to be entirely flat, and at least portions of these aluminum members, which portions are superposed on each other, need to be flat to enable the aluminum members to be joined together in these flat portions by the friction stir spot-welding operation. Accordingly, it is possible to form the sheets into various shapes by various kinds of forming operations such as a pressing operation, and to join together the thus obtained formed articles according to the invention. Further, the present invention is also applicable to an operation for joining together members whose portions other than the portions in which these members are superposed on each other take the form of a block, column, cylinder, box or the like, rather than a sheet. Additionally, the aluminum member located on a forward side in the direction of insertion of the rotary tool may take the form of a block, rather than a sheet.

In the rotary tool 10 shown in FIG. 1, the screw portion 18 is formed on the outer circumferential surface of the central probe 16, to effectively stir the metals of the aluminum members around the central probe 16. Alternatively, various kinds of grooves or protrusions may be formed in place of the screw portion 18, or the outer circumferential surface of the central probe 16 may be an even cylindrical surface without the screw portion 18.

The distal end portion of the central probe 16 of the rotary tool 10 is inserted into the stack of the two aluminum members 24 and 26, such that the distal end portion of the central probe 16 reaches the inside of the aluminum member 26 located on the forward side in the direction of insertion of the central probe 16 (the lower side as seen in FIG. 2), and such that the outer periphery of the distal end face of the intermediate probe 14 is also inserted into the inside of the aluminum member 26. As a result, the stirred zone 30 is formed over a large area, and the stiff oxide film can be effectively destructed, whereby the obtained joined article has a sufficiently high degree of joint strength. However, the friction stir spot-welding operation may be performed such that the outer periphery of the distal end face of the intermediate probe 14 is positioned within the aluminum member 24 located on the backward side in the direction of insertion of the intermediate probe 14. Particularly, it is confirmed that in the case where the friction stir spot-welding operation is performed such that only the central probe 16 is positioned within the aluminum member 26 located on the forward side in the direction of insertion of the central probe 16, the characteristics of the rotary tool whose distal end portion has the double-stepped umbrella shape according to the present invention can be more effectively exhibited.

It is to be understood that the present invention may be embodied with various other changes, modifications and improvements which are not illustrated herein and which may occur to those skilled in the art, without departing from the spirit and scope of the invention, and that such changes, modifications and improvements are also within the scope of the invention.

| NOMENCLATURE OF REFERENCE SIGNS | |
|---|---|
| 10: Rotary Tool | 12: Tool Body |
| 14: Intermediate Probe | 16: Central Probe |
| 18: Screw Portion | 20: First Shoulder Surface |
| 22: Second Shoulder Surface | 24, 26: Aluminum Member |
| 30: Stirred Zone | |

The invention claimed is:

1. A rotary tool for friction stir spot-welding, the rotary tool being configured to perform a friction stir spot-welding operation on a stack of two aluminum members, the rotary tool having a cylindrical tool body rotatable about its axis, and a probe which is provided in a central part of a distal end portion of the tool body so as to extend coaxially with the tool body, and which is inserted into the stack of the two aluminum members:
   wherein the probe has a stepped structure consisting of: a cylindrical intermediate probe having an outside diameter that is held within a range of 40-80% of an outside diameter of the tool body and projecting from the distal end portion of the tool body so as to extend coaxially with the tool body; and a cylindrical central probe having an outside diameter that is held within a range of 50-90% of the outside diameter of the intermediate probe and projecting from the intermediate probe so as to extend coaxially with the intermediate probe; and
   wherein a distal end face of the tool body provides a first shoulder surface which is gradually recessed in a radially inward direction so as to have an angle ($\theta_1$) of inclination of the first shoulder surface that is held within a range of 10-30° and which is connected to a proximal portion of the intermediate probe at a position radially inwardly spaced apart from an outer periphery of the distal end face of the tool body, while a distal end face of the intermediate probe provides a second shoulder surface which is gradually recessed in a radially inward direction so as to have an angle ($\theta_2$) of inclination of the second shoulder surface that is held within a range of 10-30° and which is connected to a proximal portion of the central probe at a position radially inwardly spaced apart from an outer periphery of the distal end face of the intermediate probe.

2. The rotary tool for friction stir spot-welding according to claim 1, wherein at least one of the first shoulder surface and the second shoulder surface is an oblique surface obliquely extending from the outer periphery of the distal end face of the tool body or the intermediate probe toward an axis thereof at a predetermined angle to give a recessed configuration.

3. The rotary tool for friction stir spot-welding according to claim 1, wherein a screw portion is formed on an outer circumferential surface of the central probe.

4. The rotary tool for friction stir spot-welding according to claim 1, wherein the central probe is formed so as to project within a recessed portion formed by the second shoulder surface of the intermediate probe such that a distal end face of the central probe and the outer periphery of the distal end face of the intermediate probe both extend coaxially from the tool body by a same distance.

5. The rotary tool for friction stir spot-welding according to claim 1, wherein the intermediate probe and the central probe are configured to be inserted into the stack of the two aluminum members, and at least one of the two aluminum members is made of an aluminum based alloy material containing Mg in an amount of not less than 3% by mass.

6. A friction stir spot-welding method practiced on a stack of two aluminum members, the method comprising using a rotary tool having a cylindrical tool body rotatable about its axis, and a probe which is provided in a central part of a distal end portion of the tool body so as to extend coaxially with the tool body, and which is inserted into the stack of the two aluminum members, with at least one of the two aluminum members being made of an aluminum based alloy material containing Mg in an amount of not less than 3% by mass:
   wherein the probe of the rotary tool has a stepped structure consisting of: a cylindrical intermediate probe having an outside diameter that is held within a range of 40-80% of an outside diameter of the tool body and projecting from the distal end portion of the tool body so as to extend coaxially with the tool body; and a cylindrical central probe having an outside diameter that is held within a range of 50-90% of the outside diameter of the intermediate probe and projecting from the intermediate probe so as to extend coaxially with the intermediate probe;
   wherein a distal end face of the tool body gives a first shoulder surface which is gradually recessed in a radially inward direction so as to have an angle ($\theta_1$) of inclination of the first shoulder surface that is held within a range of 10-30° and which is connected to a proximal portion of the intermediate probe at a position radially inwardly spaced apart from an outer periphery of the distal end face of the tool body, while a distal end face of the intermediate probe gives a second shoulder surface which is gradually recessed in a radially inward direction so as to have an angle ($\theta_2$) of inclination of the second shoulder surface that is held within a range of 10-30° and which is connected to a proximal portion of the central probe at a position radially inwardly spaced apart from an outer periphery of the distal end face of the intermediate probe; and wherein a distal end portion of the central probe is inserted into one of the two aluminum members that is located on a forward side in a direction of insertion of the central probe.

7. The friction stir spot-welding method according to claim 6, wherein one of the two aluminum members that is located on a side on which the probe is inserted into the stack is made of an aluminum based alloy material containing Mg in an amount of not less than 3% by mass.

8. The friction stir spot-welding method according to claim 6, wherein a distal end portion of the intermediate probe is inserted into said one of the two aluminum members that is located on the forward side in the direction of insertion of the central probe.

9. The friction stir spot-welding method according to claim 6, wherein only the central probe is inserted into said one of the two aluminum members that is located on the forward side in the direction of insertion of the central probe.

* * * * *